2 Sheets. Sheet: I.

R. TEASDALE. Calculating Machine.

No. 121,687. Patented Dec. 5, 1871.

Witnesses:
A. Bennerkendorf
Francis McArdle

Inventor:
R. Teasdell
per [signature]
Attorneys.

2 Sheets. R. TEASDALE. Calculating Machine. Sheet: II.
No. 121,687. Patented Dec. 5, 1871.

Witnesses:
A. Bennerkendorf.
Francis McArdle.

Inventor:
R. Teasdale
per Munn & Co.
Attorneys.

121,687

UNITED STATES PATENT OFFICE.

ROBINSON TEASDALE, OF ALBERTON, GEORGIA.

IMPROVEMENT IN CALCULATING-MACHINES.

Specification forming part of Letters Patent No. 121,687, dated December 5, 1871.

*To all whom it may concern:*

Be it known that I, ROBINSON TEASDALE, of Alberton, in the county of Albert and State of Georgia, have invented a certain Improved Calculator; and I do hereby declare that the following is a full, clear, and exact description thereof, which will enable others skilled in the art to make and use the same, reference being had to the accompanying drawing forming part of this specification.

My invention consists in the improvement of calculators, as hereinafter fully described and subsequently claimed.

Figure 1:
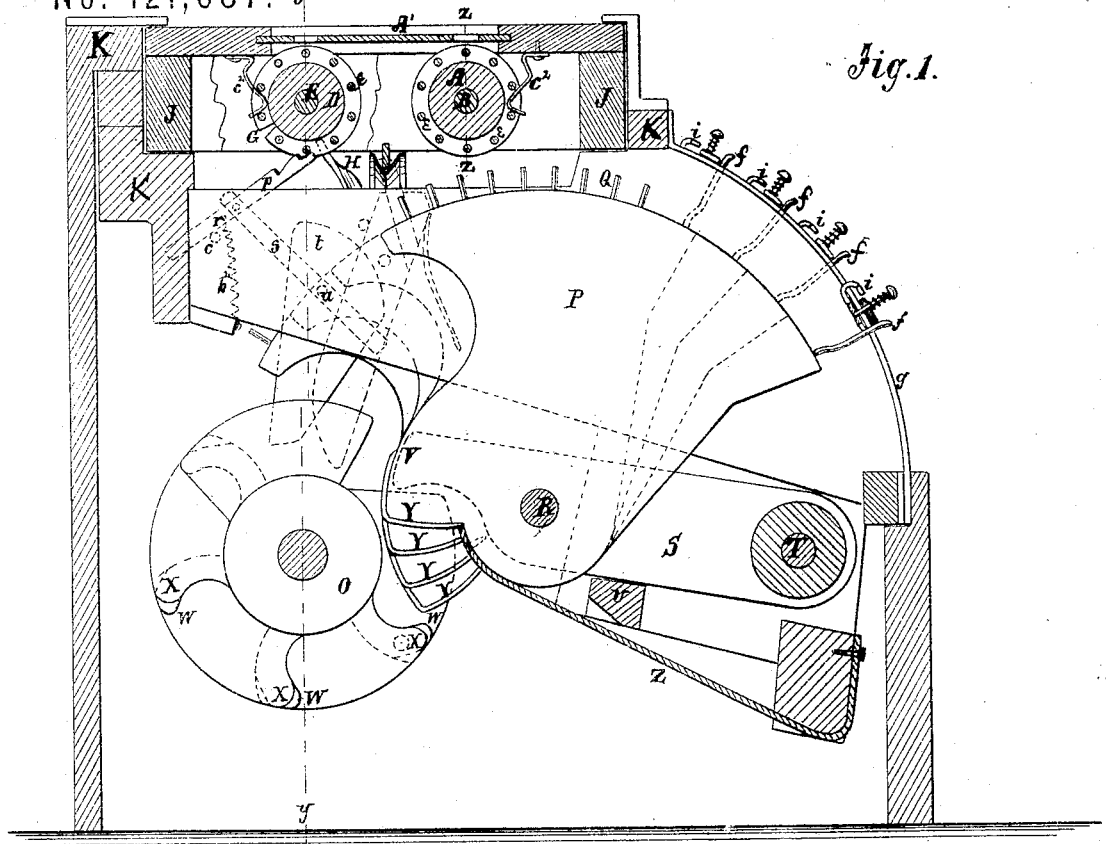
Figure 2:
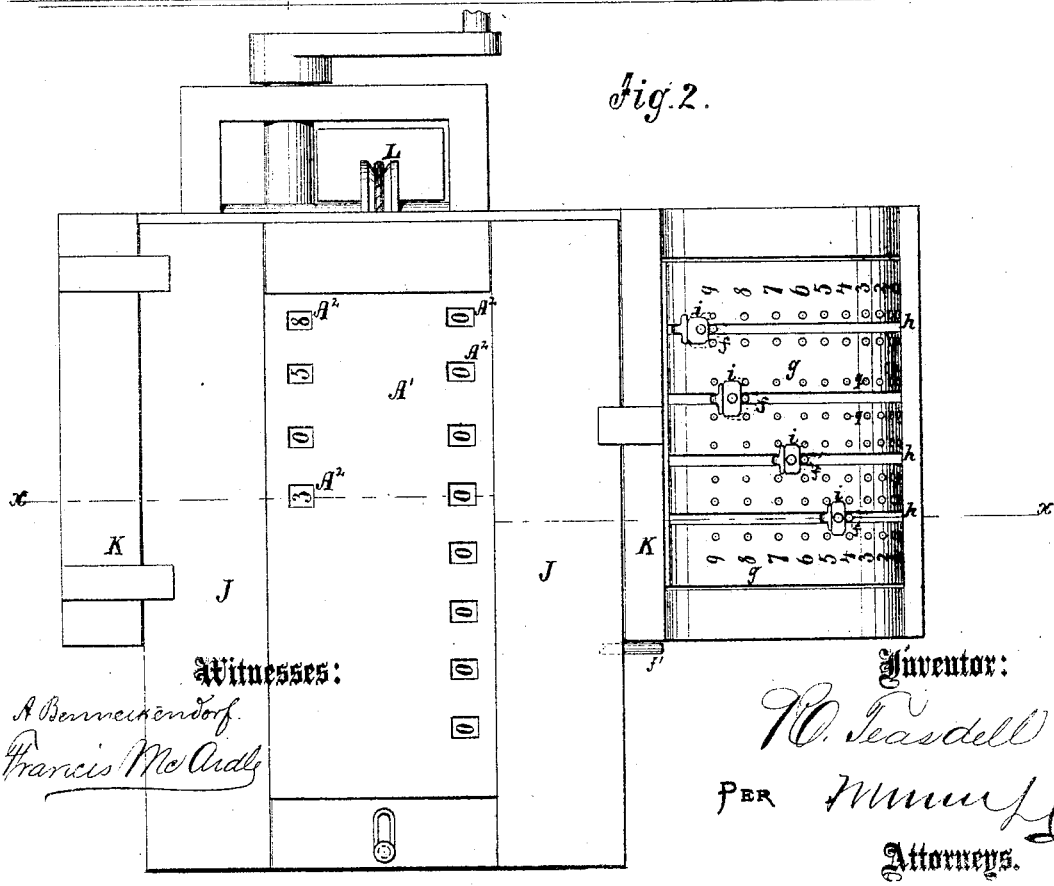
Figure 3:
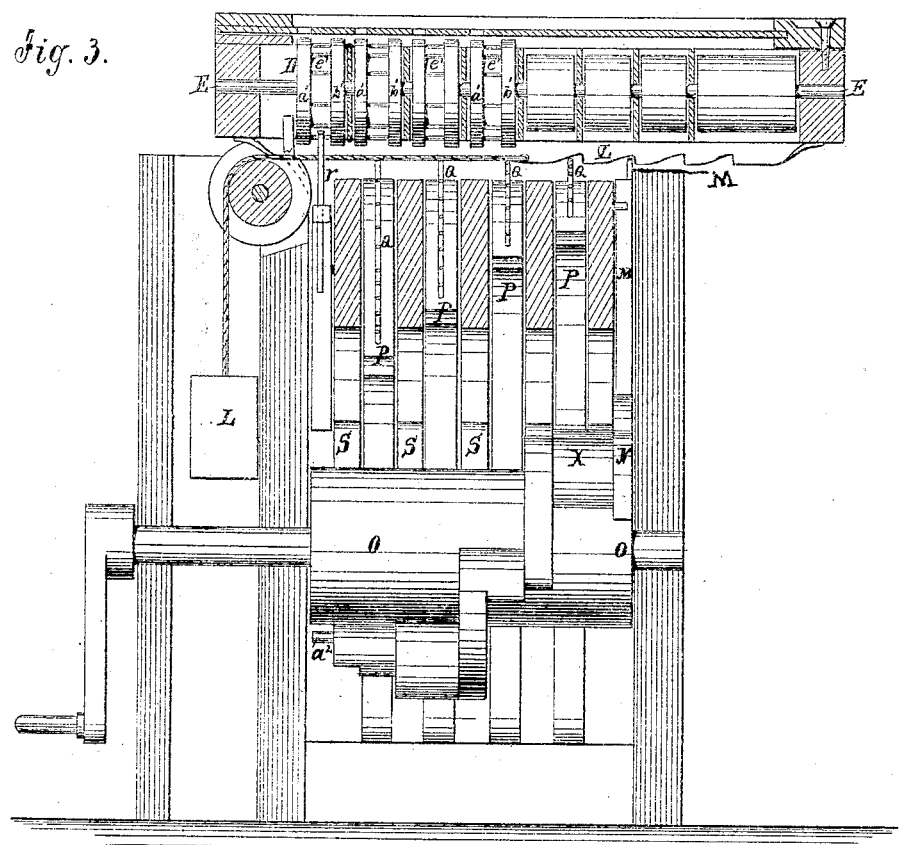
Figure 4:
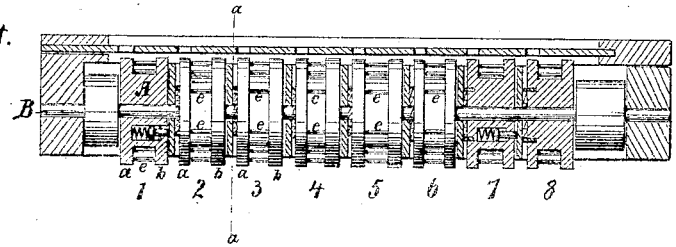
Figure 5:
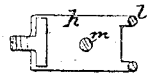
Figure 6:
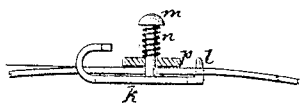
Figure 7:
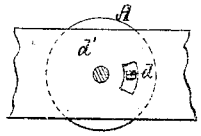
Figure 8:
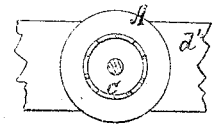

Figure 1 is a sectional elevation of my improved machine taken on the line $x$ $x$ of Fig. 2. Fig. 2 is a plan view. Fig. 3 is a sectional elevation taken on the line $y$ $y$ of Fig. 1. Fig. 4 is a partial section taken on the line $z$ $z$ of Fig. 1. Fig. 5 is a plan view of one of the catches used for setting the segments for turning one set of disks. Fig. 6 is a side elevation of the same. Figs. 7 and 8 are opposite views of a section of Fig. 4 on a line, $a$ $a$.

Similar letters of reference indicate corresponding parts.

A is a series of eight (more or less) disks mounted on a shaft, B, so as to turn freely. Each has two faces, $a$ and $b$, which are numbered from 1 to 0, consecutively, but in reverse order, the 0 of one disk being opposite the 9 of the other. Each disk after the first is provided with a ratchet, $c$, to be turned one degree, for carrying, by a pawl, $d$, on the preceding disk. At each revolution of the latter the said pawls drop through a dividing-plate, $d'$, to act on the ratchets, and are forced back by an incline plane at the proper time. Between the faces $a$ $b$ are pins or teeth $e$, with which the segments for turning them gear. D is another series of similar double-faced disks, being four or more, mounted on a shaft, E, parallel with the shaft B, but some distance from it. The faces of these disks are numbered like disks A, except that the noughts are opposite each other and are marked $a'$ $b'$. They also have pins or teeth, $e$, for being turned by a push-pawl, $r$; but they are not provided with ratchets and pawls or pins for turning one by the other. Each one is provided with a notch, G, to allow it to escape laterally past a stop-bar, H, when the notch arrives at the bar, to allow all the disks to be shifted laterally with reference to the instruments employed for turning them, as is required in some calculations, as will appear further on. But, as it is desirable in some cases not to let the disks shift at the moment the notch in the disk comes to the stop, a notched bar, L, is arranged on the frame which carries the disks, to be held by a stop-lever, M. This lever is moved out of connection with the said bar at the proper time by a cam, N, on the cam-shaft O, which shaft is turned by a crank or other means to actuate all the moving parts. For this shifting the shafts carrying the disks are mounted in a sliding case or frame, J, fitted upon the frame K, on which the said turning instruments are mounted so as to slide back and forth, as indicated in Fig. 2; and a weight, L, and cord are provided at one end to move said frame in one direction; or a spring may be used to shift the said frame in that direction automatically. In the other direction it may be shifted by hand or by any other competent means. The length of its shift is limited by a pin, $f$, Fig. 2, hook, or other device. P represents the toothed segments employed for turning the disks A by their teeth Q, which are made to gear with the pins $e$ of said disks and to ungear in the following manner: Each is pivoted at R to a bar, S, which is pivoted to a fixed support at T, and supported at U on a rest, which holds the end V in a position to be acted on by a cam, W, at the proper time to be lifted up to raise the segment P high enough to gear with the disk above it, as clearly shown in Fig. 1, immediately after which another cam, X, on the same shaft that cam W is, comes in contact with a projection, $y$, of the hub of segment P and turns it so as to move the teeth Q to the right, and thus revolve the disk until the last tooth at the left escapes from the disk; then the cam W escapes from the end V of S, letting the segment fall back so that it may return to its original position without the teeth coming in contact with the disk; at the same time, or a little later, the cam X escapes from the projection $y$ and the spring Z swings the segment back. The action of all the segments is alike, but each follows the other in succession, the cams being arranged spirally on the shaft or drum O for the purpose. For adjusting or setting these segments so that they may be geared with the disks according to the number of figures, they are to be moved at one operation. They are provided with a rod, $f$, projecting radially through a curved and slotted number-plate, $g$, having as many slots $h$ as there are segments, and being numbered from 0 to 9, inclusive, said numbers being equally divided along a space equal to that through which the said rods $f$ will travel when the segments move far enough to turn the disks from 0 to 1, said segments having nine teeth properly spaced for so turning them. In each slot $h$ is an adjustable stop, $i$, above the rods $f$, that may be moved from 9 down toward 0 as many numbers as it is desired that the disks shall be turned less than the full number or revolution; for instance, if the disks are to be turned five figures, the stops will be moved down to number five on plate $g$ and secured. This moves the segments, before being geared with the disks, so far in the direction they move when turning them that when afterward lifted up into gear and turned by the cams they will turn the disks the requisite numbers only. These stops consist, in this instance, in a hook-headed plate, $k$, with pins $l$, pin $m$, spring $n$, and plate $p$, Figs. 5 and 6, adapted to slide up and down in the slotted plate, and have the pins $l$ engaged with holes $q$ by the spring $n$, the plate $k$ being under plate $g$, with the pin $m$ made fast to it, and the plate $p$ being on the upper side, with the spring bearing at one end upon it and at the other end under the head of the pin to force the pins $l$ outward. Said pins are disengaged from the holes to shift the stops by pushing the pin $m$ inward.

I do not, however, limit myself to this particular construction of the stops, but mean to use any that may be found best.

The disks D are turned, one at a time, by a pawl, $r$, Fig. 1, which is connected by a bar, $s$, to a block, $t$, pivoted at $u$ to the frame or case, and acted on at the lower end by a pin, $a^2$, Fig. 3, on the cam-shaft. This pawl $r$ is pivoted to the end of bar $s$, and is provided with a spring, $b^2$, which pulls it back so that the upper end falls enough below the disks to allow them to slide laterally when required to do so. Each disk is provided with a retaining-spring pawl, $c^2$, to prevent them from overrunning. $A^1$ is the cover used to hide the disks and numbers, except as they are to be seen through a hole, $A^2$, properly arranged for each disk. Said cover is arranged to shift the holes to either face of the disks, as required, according to the calculation to be made. The disks will be provided with push-pawls and ratchet-wheels of any kind to turn them quickly, as required, to set them, after having been disarranged by a previous operation, for the next proposition to be worked out; or other suitable devices may be used.

With this improved machine examples in addition, subtraction, multiplication, division, square and cube-root, &c., may be worked out with great rapidity. For addition—the stops $i$ being set on the plate $g$ to the figures to be added in as many of the slots as there are columns to be added—one turn of the crank will adjust the faces $a$ of the disks A, so that the sum of the amount represented on plate $g$ at the said stops and the amount seen on said disks before the operation will be seen on said disks after the turning of the crank. The operation is repeated for as many figures as there are in the columns. The operation for subtraction is precisely the same, except that the cover $A^1$ is shifted so that the faces $b$ of said disks, with their figures arranged reversely to those on the faces $a$, are seen. For multiplication—the disks A being all adjusted so that the zero or nought of the faces $a$ are seen through the cover—the disks D are adjusted to represent the multiplier on their faces $a$, and the stops $i$ are adjusted for the multiplicand; then the crank is turned as many times as the denomination of the right-hand figure of the multiplier, then the nought, being at the hole $A^2$ and the notch G coming around to the stop, the frame is ready to shift to the right for the next disk D, to be acted on by the pawl $r$; but it is restrained by the lever M until all the segments have ceased to work in the last revolution of the crank, which is necessary to prevent the disks and teeth of the segments coming into contact; then said lever being tripped by the cam N, the disks, together with the frame supporting them, will be shifted, and the second disk D brought to the pawl $r$, to be in like manner turned as many movements as the denomination of its figure of the multiplier; and so on until all the disks making up the multiplier have been acted on, when the product will be seen on the disks A through the holes in the cover above them. Thus the multiplication of any two sums together will be accomplished by as many turns as the sum of the figures in the multiplier added together. For division the sum to be divided is set up on the faces $b$ of the disks A, the disks D being set at nought, and the divisor being indicated by the stops on the plate $g$. The frame J is then adjusted as far to the right hand (as seen in Fig. 2 looking toward the plate $g$) as will be necessary for the disk D, on which the left-hand figure of the product will be shown to be actuated first; also, so that only as many left-hand figures of the sum to be divided (represented by disks A) as the divisor will go in will be coincident with the right-hand segments, whose stops $i$ are set to the divisor; then, by turning the crank, the portion of the sum to be divided that is subject to the action of the segments will be carried away, except the remainder, if any, while the quotient will be shown on the disk D, that is subject to the action of the pawl $r$; then the frame J is moved one shift to the left to bring the remaining part of the sum to be divided in front of the segments representing the divisor, also to bring the next right-hand disk D to the pawl $r$ for being turned to show its part of the quotient. This operation is continued till all the sum to be divided and the last disk D at the right have been brought to the segments representing the divisor, when the operation will be complete and the quotient will be shown on disks D and the remainder on the right-hand disks A. For extracting the square root I set up the number on the faces $b$ of the disks A and separate the same into periods of two figures each by placing a point over the right-hand figure and each second figure to the left; then I set the stops at the right of the segment that is to act on the left-hand period to enable me to subtract from the said left-hand period only, which I do, beginning with one and continuing with the odd numbers three, five, seven, &c., as long as the remainder of the period continues to be greater than or equal to the number to be taken from it, the frame J being at this time shifted to the right about as many disks as the number of the periods in the same. The disk D, at this time subject to the action of the pawl r, will be turned one point for each subtraction, and the figure shown at the completion of the subtractions from the first period will correspond to the number of said subtractions and to the first figure of the root; then I shift the frame J one disk to the left and continue the subtraction from the remainder and the next period together, deducting the next odd number above the one last deducted from the second disk from the left, and beginning again with one to subtract from the next right-hand disk, operating the segment at the right hand of the one operated at the beginning. For example: if the last number subtracted from the first period was five, I will continue the subtraction from the remainder and the next period, together with six on the next disk to the right and one on the second right-hand disk, making sixty-one, and proceed as before; but if the said remainder and the next period, or the period alone—there being no remainder—be not greater than the sum to be subtracted, I move the frame another period to the left and then consider the sum to be subtracted six hundred and one, and proceed as before. This will add a nought to the root on the disks D, as one of them will be passed beyond the pawl r, which ordinarily moves it, without being moved by it, and the subsequent figure of the root, developed by the continuation of the operation, will appear at the right of the nought on the disks D.

The extraction of cube-root and other calculations can be made by the improved machine, but enough has been described to illustrate fully the principle of the operation.

I may use reciprocating toothed bars in the place of the disks equally as well as the latter, and I consider them in all respects equivalent to the segments, and do not mean to be limited in my claim to the segments.

Having thus described my invention, I claim as new and desire to secure by Letters Patent—

1. The combination of the cams W X, bars S, segments P, and springs Z, substantially as specified.

2. The disks D, having a notch G, stop H, notched bar L, tripping-pawl M, and the shifting frame, all combined and arranged substantially as specified.

The above specification of my invention signed by me this 11th day of September, 1871.

ROBINSON TEASDALE.

Witnesses:
GEO. W. MABEE,
T. B. MOSHER.

(42)